(12) United States Patent
Condon et al.

(10) Patent No.: US 7,810,762 B2
(45) Date of Patent: Oct. 12, 2010

(54) BI-DIMENSIONAL FOLDING INSULATOR

(75) Inventors: Duane R. Condon, Ramona, CA (US);
Frank D. Julian, Kansas City, MO (US);
Truman J. Stegmaier, Lee's Summit, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 461 days.

(21) Appl. No.: 11/837,679

(22) Filed: Aug. 13, 2007

(65) Prior Publication Data
US 2009/0044474 A1 Feb. 19, 2009

(51) Int. Cl.
*F16L 3/12* (2006.01)
(52) U.S. Cl. .................. 248/74.1; 248/65; 248/74.4
(58) Field of Classification Search ............ 248/65, 248/74.1, 74.3, 74.4, 68.1; 138/118, 188.1
See application file for complete search history.

(56) References Cited

U.S. PATENT DOCUMENTS

| | | | |
|---|---|---|---|
| 3,092,361 A | 6/1963 | Cook | |
| 3,203,653 A | 8/1965 | Hall | |
| 3,463,427 A * | 8/1969 | Fisher | 248/68.1 |
| 4,318,518 A * | 3/1982 | Davis | 248/60 |
| 4,930,733 A | 6/1990 | Logsdon | |
| 5,362,018 A * | 11/1994 | Darr et al. | 248/74.3 |
| 5,398,383 A * | 3/1995 | Bingold | 24/16 PB |
| 5,421,541 A | 6/1995 | Condon | |
| 5,702,076 A | 12/1997 | Humber | |
| 6,126,119 A | 10/2000 | Giangrasso | |
| 6,598,835 B2 | 7/2003 | Minnick | |
| 6,601,802 B1 | 8/2003 | Howe | |
| 6,604,715 B2 | 8/2003 | Howe | |
| 6,658,703 B1 * | 12/2003 | Teagno et al. | 24/16 PB |

\* cited by examiner

*Primary Examiner*—Amy J Sterling
(74) *Attorney, Agent, or Firm*—Erickson, Kernell, Derusseau & Kleypas, LLC

(57) ABSTRACT

An insulator comprises at least three sections hingedly connected to one another, including a center section and a pair of outer sections. The sections are shaped so that if the outer sections are folded in a first direction relative to the center section, the insulator can be used with a first tube of a first diameter, and if the outer sections are folded in a second direction relative to the center section the insulator can be used on second tube of a different diameter from the first diameter.

28 Claims, 5 Drawing Sheets

BI-DIMENSIONAL FOLDING INSULATOR

BACKGROUND OF THE INVENTION

1. Field of the Invention

This invention relates to insulators for fitment between tubes and building members through which the tubes pass, and in particular to a folding insulator that is reversibly foldable to fit around tubes of two different diameters.

2. Description of the Related Art

In residential and commercial plumbing applications, pipes and other tubes often pass through openings in wall studs, joists and other building members. The building members may be wood or metal. If the tube is allowed to rest against the building member, undesirable noise will be produced by sliding contact between the tube and the building member as the tube expands and contracts due to temperature changes. Furthermore, if the building member is metal, corrosion caused by contact between dissimilar metals may form on copper tubes. Heat from hot water pipes may also be lost through conduction to the building members.

It is known to insulate and isolate tubes from building members by inserting an insulator into the opening in the building member around the tube. An insulator typically comprises a plastic toroid or "doughnut" which fits around the tube inside the opening. The insulator is often split so that it may be placed onto a tube along the length of the tube and not just from the ends. In electrical applications, similar insulators may be used to isolate tubes such as conduit and cable from building members.

A problem with current insulators is that they are generally tube size specific, and therefore a contractor must stock a supply of insulators for each size tube that he or she normally encounters. For example, a plumbing contractor would need a supply of insulators for both ½ inch and ¾ inch CTS pipe to complete most jobs.

Another problem is that an insulator made for use with wooden building members may not work with metal building members, and vise versa. Wooden building members are typically 1½ inches thick whereas metal building members only provide a thin web of metal to fasten the insulator to. Furthermore, the standard openings used when running tube through wood and metal building members are different. Wooden building members are typically drilled with one and three-eighths inch openings whereas the tools used to punch openings in metal building members produce a one and eleven thirty seconds inch opening.

What is needed is an insulator which can be used with more than one size of tube, and preferably one which can be used with both wood and metal building members

SUMMARY OF THE INVENTION

The present invention generally comprises an insulator for insertion into a hole in a building member (such as a joist or wall stud) around a tube. The insulator comprises at least three sections hingedly connected to one another, including a center section and a pair of outer sections. The sections are shaped so that if the outer sections are folded in a first direction relative to the center section, the insulator can be used with a first tube of a first diameter, and if the outer sections are folded in a second direction relative to the center section the insulator can be used on second tube of a different diameter from the first diameter.

DETAILED DESCRIPTION OF THE PREFERRED EMBODIMENTS

Figure 1:
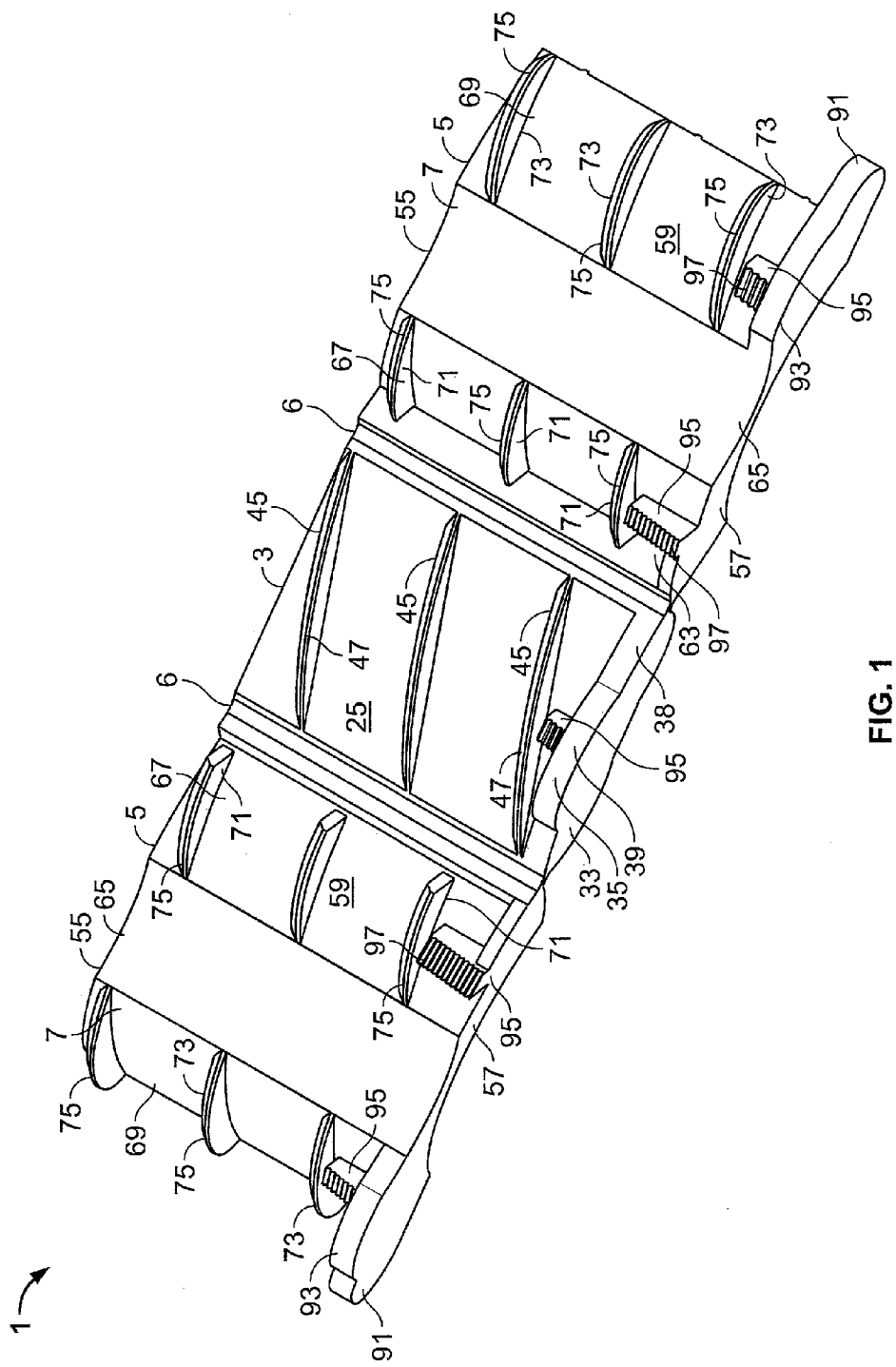
FIG. 1 is a perspective view of an insulator according to the present invention showing a first side thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

As used herein, the word "tube" is intended to include plumbing pipe and tubing of any diameter or material, whether rigid or flexible, as well as electrical conduit and cable.

Figure 2:
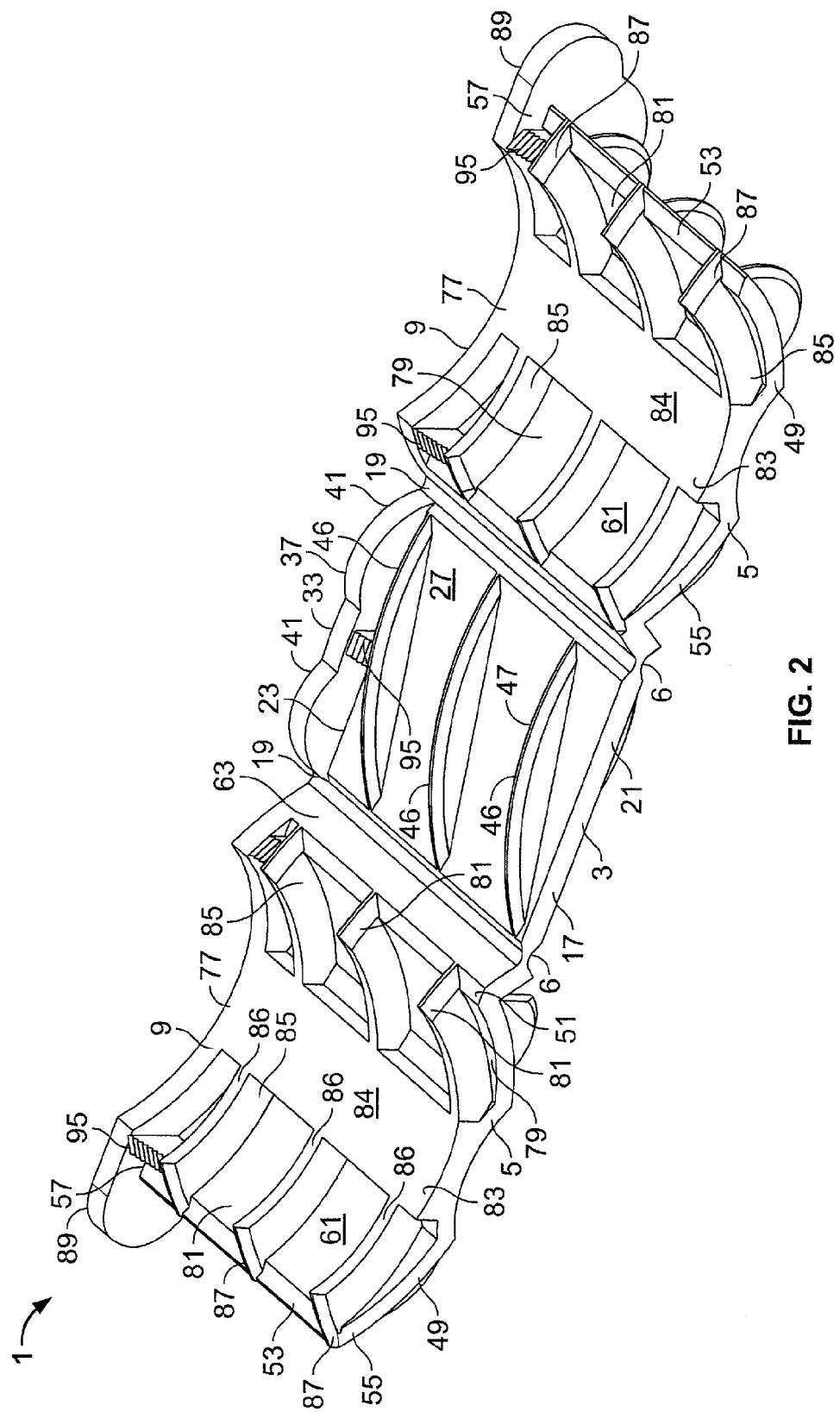
FIG. 2 is a perspective view of the insulator showing a second side thereof.
Figure 3:
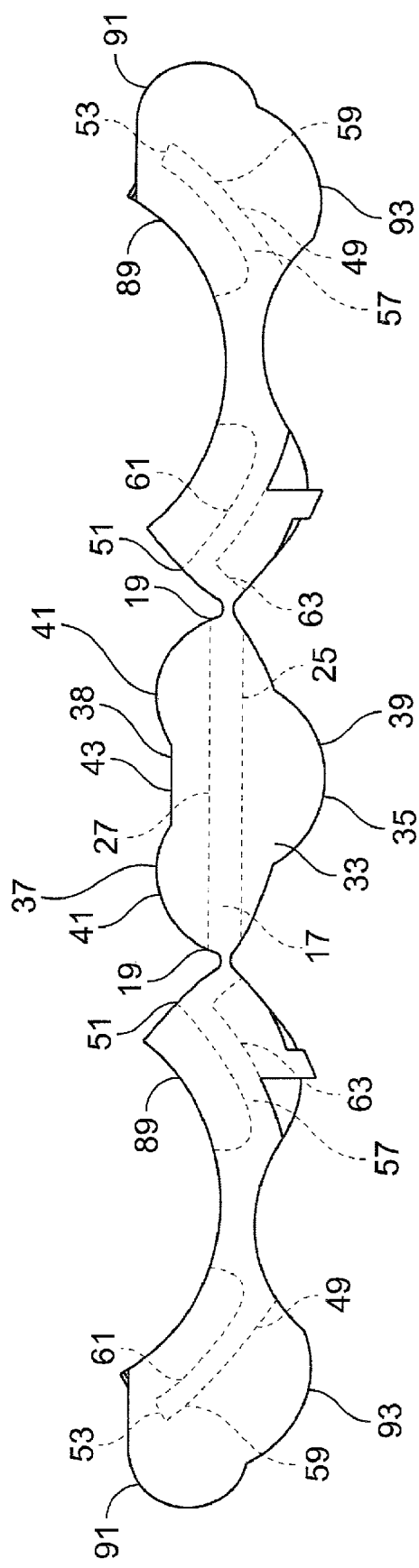
FIG. 3 is a front elevational view of the insulator.

Referring to the drawings in more detail, and in particular to FIGS. 1-3, the reference number 1 generally designates a bi-dimensional folding insulator according to the present invention. The insulator 1 includes a center section 3 and a pair of outer sections 5 which are hingedly connected to the center section 3 on opposite sides thereof. The insulator 1 is preferably of unitary molded construction with living hinges 6 between the center section 3 and the outer sections 5. The hinges 6 define generally parallel fold lines. The outer sections 5 each include a first side 7 and a second side 9. A preferred material for the insulator 1 is a flexible plastic such as Low Density Polyethylene (LDPE).

Figure 4:
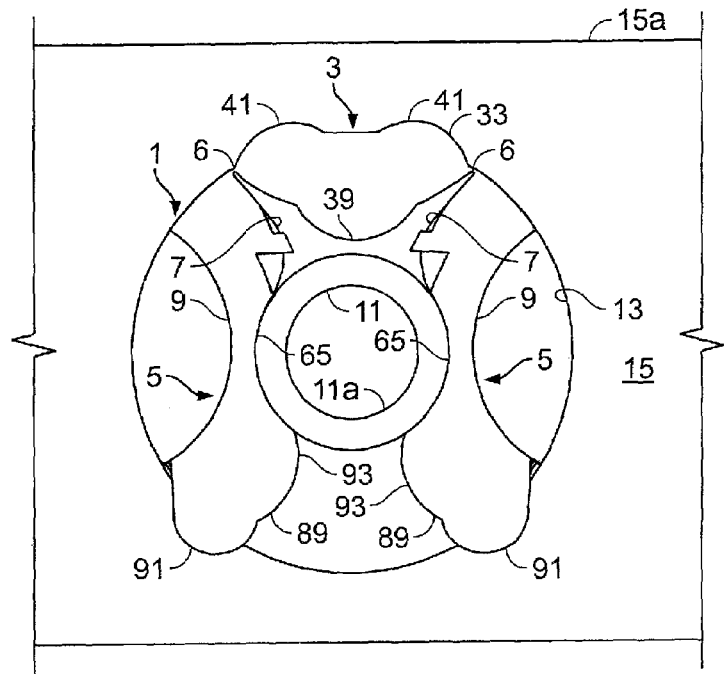
FIG. 4 is a front elevational view of the insulator showing the insulator folded into a first position and insulating a first tube from a building member.
Figure 5:
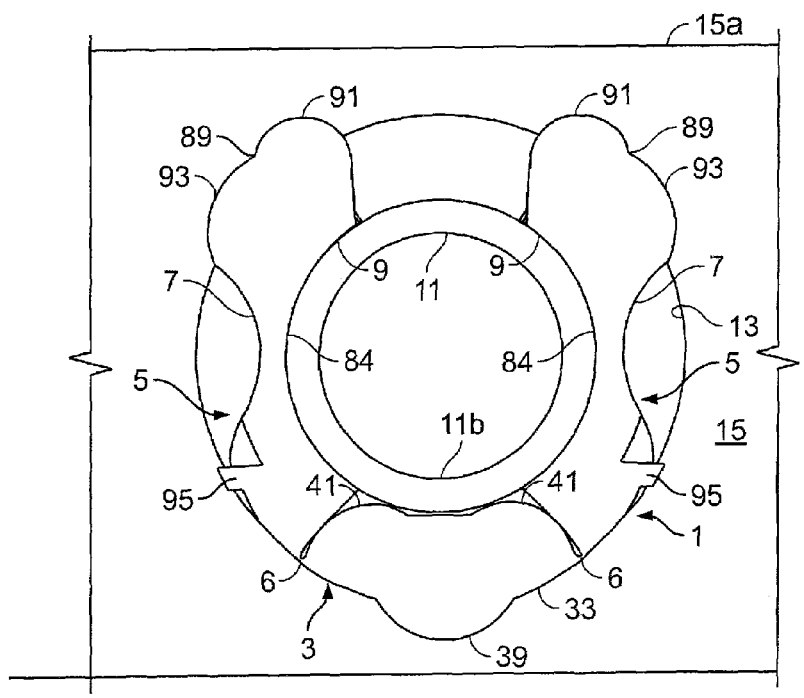
FIG. 5 is a front elevational view of the insulator showing the insulator folded into a second position and insulating a second, larger tube from the building member.

Referring to FIGS. 4 and 5, the outer sections 5 are moveable relative to the center section 3 between a first position as shown in FIG. 4 with the first sides 7 facing toward one another wherein the insulator 1 is configured to receive a first tube 11a of a first diameter, and a second position as shown in FIG. 5 with the second sides 9 facing toward one another wherein the insulator 1 is configured to receive a second tube 11b of a second diameter larger than the first diameter. For example, the first tube 11a may be a ½ inch CTS (Copper Tube Size) pipe having a ⅝ inch outside diameter and the second tube 11b may be a ¾ inch CTS pipe having a ⅞ inch outside diameter. It is to be understood, however that the invention is not to be limited to use with tubes of these particular diameters, or to CTS pipe in general, as the invention has application to other sizes and types of tube including, but not limited to, IPS (Iron Pipe Size) pipe and DWV (Drain Waste Vent) pipe of varying diameters, electrical conduit and cable.

The insulator 1 is adapted to be inserted into a circular opening 13 extending through a building member 15 (such as a wall stud or joist) around either a first tube 11a or a second tube 11b to isolate and insulate the tube 11a or 11b from the building member 15. The opening 13 typically has a one and three eighths inch diameter if the building member 15 is a wooden building member 15a and a one and eleven thirty-seconds inch diameter if the building member 15 is a metal building member 15b. The insulator 1 isolates the tube 11a or 11b from the building member 15 by spacing the tube 11a or 11b away from the building member 15.

Referring again to FIGS. 1-3, the center section 3 generally comprises a plate 17 having a pair of edges 19, which are each hingedly connected to a respective one of the outer sections 5, a leading end 21, a trailing end 23, a first face 25 and a second face 27. A center end flange 33 extends outwardly from the plate 17 along the trailing end 23 and includes a first flange portion 35 normal to the first face 25 and a second flange portion 37 normal to the second face 27. The first and second flange portions 35 and 37 each include a respective outer edge 38 which is shaped to form one or more outwardly extending stop tabs. The first flange portion 35 includes a single centrally located stop tab 39. The second flange portion 37 includes a pair of stop tabs 41 which are spaced outwardly from the middle of the second flange portion 37 toward the edges 19 of the plate 17 and define a notch 43 therebetween.

The center section 3 further includes a plurality of flexible cross ribs 45 and 46 (three of each shown) which extend outwardly from the first and second faces 25 and 27, respectively, of the plate 17. The ribs 45 are shown as being parallel to each other and positioned at an oblique angle to the center end flange 33. The ribs 46 are also shown as being parallel to each other and positioned at an oblique angle to the center end flange 33. Each rib 45 and 46 includes an arcuately curved outer edge 47. The outer edges 47 of the ribs 45 and 46 are tapered so as to be lower proximate the leading end 21 and higher proximate the trailing end 23.

Each of the outer sections 5 is formed about a curved plate 49 having a first or proximate edge 51, a second or distal edge 53, a leading end 55, a trailing end 57, a first face 59 and a second face 61. An offsetting wall 63 is fixedly connected to the proximate edge 51 of each outer section 5 and hingedly connected to a respective edge 19 of the center section 3. The offsetting walls 63 serve to offset the second faces 61 of outer sections 5 outwardly from the second face 27 of the center section 3.

The first face 59 of the curved plate 49 of each outer section 5 includes a center portion 65, an inner portion 67 and an outer portion 69. The center portion 65 is concave and has an inside radius selected to match the outside radius of the first or smaller tube 11a so as to be engageable therewith. The inner and outer portions 67 and 69 of the first face 59 are generally convex. A plurality flexible cross ribs 71 (three shown) are formed on each inner portion 67 and a plurality of similar ribs 73 (three shown) are formed on each outer portion 69. The ribs 71 and 73 are shown as being parallel to each other and positioned at an oblique angle to the trailing end 57 of the plate 49. Each rib 71 and 73 includes an arcuately curved outer edge 75. The outer edges 75 are tapered so as to be lower proximate the leading end 55 and higher proximate the trailing end 57.

Similarly, the second face 61 of the curved plate 49 of each outer section 5 includes a center portion 77, an inner portion 79 and an outer portion 81. The center portion 77 of each plate 49 has a platform 83 formed thereon having a concave outer face 84 with an inside radius selected to match the outside radius of the second or larger tube 11b so as to be engageable therewith. The inner portion 79 and outer portion 81 of each plate 49 are generally concave and have a plurality of ribs 85 formed thereon. The ribs 85 each have a distal edge 86 which continues the curve of the platform 83. The ribs 85 are shown as being parallel to each other and positioned at an oblique angle to the trailing end 57 of the plate 49. Each rib 84 further includes end surfaces 87 which are tapered so as to be lower proximate the leading end 55 and higher proximate the trailing end 57.

Each outer section 5 includes an end flange 89 which extends outwardly from the plate 49 along the trailing end 57. Each end flange 89 includes a first stop tab 91 and a second stop tab 93 which both extend outwardly from the respective outer section 5. Each first stop tab 91 extends generally longitudinally outward from the distal edge 53 of the respective outer section 5. Each second stop tab 93 extends outwardly from the outer portion 69 of the first face 59 of the respective outer section 5 past the edges outer edges 75 of the ribs 73 formed thereon.

In order for the insulator 1 to more effectively engage a metal building member 15b (see FIG. 6), the insulator 1 is equipped with a plurality of serrated wedge structures 95 mounted proximate the end flanges 33 and 89 for engaging the web of the metal building member 15b through which the opening 13 is formed. Each wedge structure 95 has an inclined face 97 having serrations formed thereon. Each inclined face 97 presents a lower end toward the leading end 21 or 55 of the respective section 3 or 5 and an outwardly spaced upper end toward the trailing end 23 or 57 of the respective section 3 or 5. The insulator 1 is shown as having ten of the wedge structures 95, with one positioned on each face 25 and 27 of the center section 3 and two positioned on each face 59 and 61 of each outer section 5.

Figure 6:
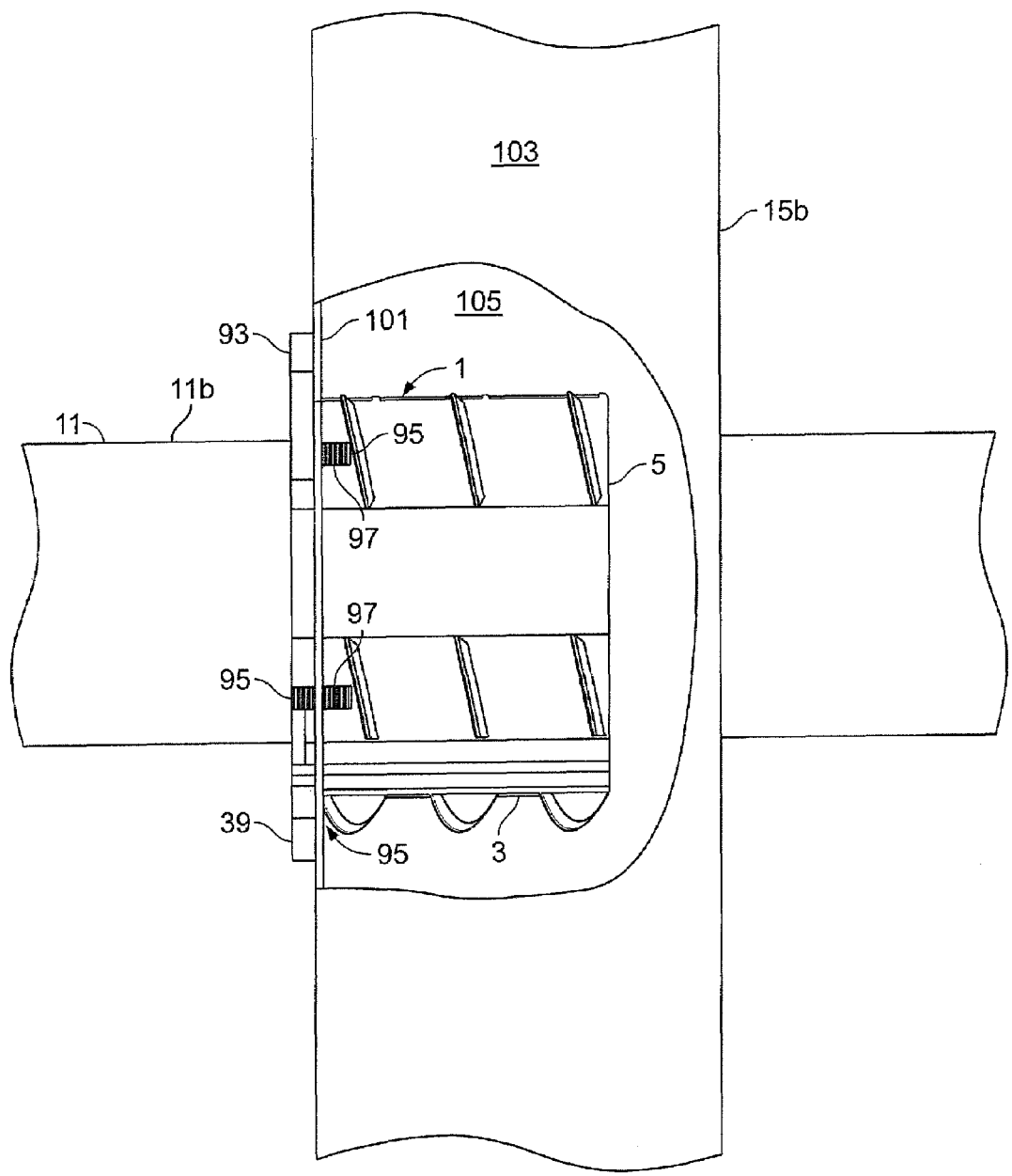
FIG. 6 is a right side elevational view of the insulator showing the insulator in the second position and insulating the second tube from a metal building member, with a portion of a right side flange of the building member broken away for clarity.

In use, and as shown in FIGS. 4-6, the insulator 1 can be inserted between a building member 15 and a tube 11 extending through an opening 13 in the building member 15. If the tube 11 is a first or smaller diameter tube 11a, the insulator is folded around the tube 11a into a first position, as shown in FIG. 4, with the first sides 7 of the outer sections 5 facing toward one another such that the concave center portions 65 on the first sides 7 engage the tube 11a. The insulator 1 is then pressed into the opening 13 around the tube 11 until the outwardly extending stop tabs 41 and 91 on the end flanges 33 and 89, respectively, engage the building member 15. If the building member 15 is a wooden building member 15a, the ribs 46 on the second face 27 of the center section 5 and the ends 87 of the ribs 85 on the second sides 7 of the outer sections 5 will engage the inside of the building member 15a on the inside of the opening 13 to retain the insulator 1 in position. If the building member 15 is a metal building member 15b having a web 101 and opposed side flanges 103 and 105, the serrated faces 97 of the wedge structures 95 on the second face 27 of the center section 3 and on the second face 61 of the outer sections 5 will engage the web 101 of the building member 15b on the inside of the opening 13 to retain the insulator 1 in position. Alternatively, the insulator 1 can be folded into the first position and pushed into the opening 13 first, and then the tube 11a can pushed through the insulator 1 afterward.

If the tube 11 is a second or larger diameter tube 11b, the insulator is folded around the tube 11b into a second position, as shown in FIG. 5, with the second sides 9 of the outer sections 5 facing toward one another such that the concave outer face 84 of the platform 83 and the edges 86 of the ribs 85 on the second sides 7 engage the tube 11b. The tube 11b also extends into the notch 43 between the stop tabs 41 on the center section 3. The insulator 1 is then pressed into the opening 13 around the tube 11 until the outwardly extending stop tabs 39 and 93 on the end flanges 33 and 89, respectively engage the building member 15. If the building member 15 is a wooden building member 15a, the ribs 45 on the first face 25 of the center section 5 and the ribs 71 and 73 on the first sides 7 of the outer sections 5 will engage the inside of the building member 15a on the inside of the opening 13 to retain the insulator 1 in position. If the building member 15 is a metal building member 15b, the serrated faces 97 of the wedge structures 95 on the first face 25 of the center section 3 and on the first face 59 of the outer sections 5 will engage the web of the building member 15b on the inside of the opening 13 to retain the insulator 1 in position, as shown in FIG. 6. Alternatively, the insulator 1 can be folded into the second position and pushed into the opening 13 first, and then the tube 11b can pushed through the insulator 1 afterward.

It is to be understood that while certain forms of the present invention have been illustrated and described herein, it is not to be limited to the specific forms or arrangement of parts described and shown. For example, it is foreseen that in some applications, such as those using larger diameter tube, it may be desirable for the insulator 1 to have more than three sections. In those applications, one or more additional sections may be added either between the center section 3 and the outer sections 5, or the additional sections may be mounted outboard of the outer sections 5. It is further foreseen that the center section 5 may be itself be articulated and include one or more hinges.

As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. An insulator for insertion into an opening in a building member around a tube, said insulator comprising:
   a) a plurality of sections hingedly interconnected along generally parallel fold lines, one of said sections comprising a center section and at least two of said sections comprising outer sections positioned on opposites sides of said center section and having a first side configured for engagement with a first tube of a first diameter and a second side configured for engagement with a second tube of a second diameter larger than the first diameter, said center section and each of said outer sections each including a respective leading edge transverse to said fold lines for first insertion into the opening in the building member and an opposite trailing edge, at least one of said trailing edges having an outwardly extending stop tab formed thereon and wherein there are no said stop tabs on any of said leading edges; wherein:
   b) said outer sections can be folded into either a first position relative to said center section with said first sides thereof facing toward one another or a second position relative to said center section with said second sides thereof facing toward one another, in said first position said first sides at least partially defining an opening sized to receive the first tube and in said second position said second sides at least partially defining an opening sized to receive the second tube; and
   c) said insulator can be inserted into an opening in a building member around the first tube with said outer sections in said first position or around the second tube with said outer sections in said second position, such that said outer sections cooperate with said center section to engage the building member and to substantially surround the respective tube and thereby isolate the tube from the building member.

2. The insulator as in claim 1 wherein said outer sections are hingedly connected to said center section along opposite edges thereof.

3. The insulator as in claim 1 wherein each said first side includes a first concave portion having a first radius selected to be engageable with the first tube and each said second side includes a second concave portion with a second radius larger than said first radius selected to be engageable with the second tube.

4. The insulator as in claim 1 wherein said insulator is integrally molded of flexible plastic and said hinged connections are living hinges.

5. An insulator for insertion into an opening in a building member around a tube, said insulator comprising:
   a) a center section and a pair of outer sections hingedly connected to said center section along opposite edges thereof; each of said outer sections having a first side and a second side; said center section and each of said outer sections each including a respective leading edge transverse to said opposite edges of said center section for first insertion into the opening in the building member and a respective trailing edge, at least one of said sections having an outwardly extending stop tab formed thereon proximate the respective trailing edge and wherein there are no said stop tabs on any of said leading edges; wherein:
   b) said outer sections can be folded into either a first position relative to said center section with said first sides thereof facing toward one another or a second position relative to said center section with said second sides thereof facing toward one another, in said first position said first sides at least partially defining an opening sized to receive the first tube and in said second position said second sides at least partially defining an opening sized to receive the second tube; and
   c) said insulator can be inserted into an opening in a building member around the first tube with said outer sections in said first position or around the second tube with said outer sections in said second position, such that said outer sections cooperate with said center section to engage the building member and to substantially surround the respective tube and thereby isolate the tube from the building member.

6. The insulator as in claim 5 wherein each said first side includes a first concave portion having a first radius selected to be engageable with the first tube and each said second side includes a second concave portion with a second radius larger than said first radius selected to be engageable with the second tube.

7. The insulator as in claim 5 wherein each of said outer sections include a respective leading edge transverse to said opposite edges of said center section for first insertion into the opening in the building member and a respective trailing edge, each said outer section having first and second stop tabs formed thereon proximate said trailing edge, said first stop tab positioned to extend outwardly from said insulator for engagement with the building member when said outer sections are in said first position and said second stop tab positioned to extend outwardly from said insulator for engagement with the building member when said outer sections are in said second position.

8. The insulator as in claim 5 wherein said center section include a respective leading edge transverse to said opposite edges of said center section for first insertion into the opening in the building member and a respective trailing edge, said center section having first and second stop tabs formed thereon proximate said trailing edge, said first stop tab positioned to extend outwardly from said insulator for engagement with the building member when said outer sections are in said first position and said second stop tab positioned to extend outwardly from said insulator for engagement with the building member when said outer sections are in said second position.

9. An insulator for insertion into an opening in a wooden building member around a tube, said insulator comprising:
   a) a center section having opposed first and second sides, each said side having outwardly extending flexible ribs formed thereon; and
   b) a pair of outer sections hingedly connected to said center section along opposite edges thereof; each of said outer sections having a first side and a second side; wherein:
   c) said outer sections can be folded into either a first position relative to said center section with said first sides thereof facing toward one another or a second position relative to said center section with said second sides thereof facing toward one another, in said first position said first sides at least partially defining an opening sized to receive the first tube and in said second position said second sides at least partially defining an opening sized to receive the second tube; and
   d) said ribs on said first side of said center section engage the wooden building member inside said opening therein when said insulator is inserted in said opening with said outer sections in said second position and said ribs on said second side of said center section engage the wooden building member inside said opening therein when said insulator is inserted in said opening with said outer sections in said first position.

10. The insulator as in claim 9 wherein said fins generally extend across said center section from one of said opposed edges to the other.

11. The insulator as in claim 10 wherein each of said fins has an arcuate outer edge.

12. The insulator as in claim 10 wherein said fins are at an obtuse angle to said opposed edges.

13. An insulator for insertion into an opening in a wooden building member around a tube, said insulator comprising:
   a) a center section; and
   b) a pair of outer sections hingedly connected to said center section along opposite edges thereof; each of said outer sections having a first side and a second side, said first sides of said outer sections each including outwardly extending flexible ribs formed thereon; wherein:
   c) said outer sections can be folded into either a first position relative to said center section with said first sides thereof facing toward one another or a second position relative to said center section with said second sides thereof facing toward one another, in said first position said first sides at least partially defining an opening sized to receive the first tube and in said second position said second sides at least partially defining an opening sized to receive the second tube; and
   d) said ribs on said first sides of said outer sections engage the wooden building member inside said opening therein when said insulator is inserted in said opening with said outer sections in said second position.

14. An insulator for insertion into an opening in a building member around a tube, said insulator comprising:
   a) a center section; and
   b) a pair of outer sections hingedly connected to said center section along opposite edges thereof; each of said outer sections having a first side and a second side, said first sides of said outer sections having a generally convex profile and including a concave center portion; wherein:
   c) said outer sections can be folded into either a first position relative to said center section with said first sides thereof facing toward one another or a second position relative to said center section with said second sides thereof facing toward one another, in said first position said first sides at least partially defining an opening sized to receive the first tube and in said second position said second sides at least partially defining an opening sized to receive the second tube, and
   d) said concave center portions of said first sides engage the first tube when said insulator is inserted into the opening in the building member with said outer sections in said first position.

15. The insulator as in claim 14 wherein the building member is a wooden building member and said first sides of said outer sections each include outwardly extending flexible ribs on opposite sides of said concave center portion, said ribs engaging the wooden building member inside said opening therein when said insulator is inserted in said opening with said outer sections in said second position.

16. An insulator for insertion into an opening in a metal building member around a tube, wherein the opening extends through a relatively thin web of the metal building member, said insulator comprising:
   a) a center section; and
   b) a pair of outer sections hingedly connected to said center section along opposite edges thereof; each of said outer sections having a first side and a second side; wherein:
   c) said outer sections can be folded into either a first position relative to said center section with said first sides thereof facing toward one another or a second position relative to said center section with said second sides thereof facing toward one another, in said first position said first sides at least partially defining an opening sized to receive the first tube and in said second position said second sides at least partially defining an opening sized to receive the second tube and said center section and each of said outer sections of said insulator each include a respective leading edge for first insertion into the opening in the building member and a respective trailing edge, said insulator further including at least one wedge structure extending outwardly from said center section or one of said outer sections proximate the trailing edge thereof, said wedge structure having an inclined and serrated outer surface positioned to engage said web of said metal building member inside of said opening when said insulator is inserted therein.

17. The insulator as in claim 16 wherein there are a plurality of said wedge structures.

18. The insulator as in claim 17 wherein at least one of said wedge structures is positioned to engage said web of said metal building member when said insulator is inserted into said opening with said outer sections in said first position and at least one other of said wedge structures is positioned to engage said web of said metal building member when said insulator is inserted into said opening with said outer sections in said second position.

19. The insulator as in claim 17 wherein some of said wedge structures are positioned on said center section and others of said wedge structures are positioned on each of said outer sections.

20. An insulator for insertion into an opening in a building member around a tube, said insulator comprising:
   a) a center section; and
   b) a pair of outer sections hingedly connected to said center section along opposite edges thereof; each of said outer sections having a generally convex first side with a concave center portion having a radius selected to be engageable with a first tube of a first diameter and a second side with a second concave portion having a radius selected to be engageable with a second tube of a second diameter larger than said first diameter; wherein:
   c) said outer sections can be folded into either a first position relative to said center section with said first sides thereof toward one another or a second position relative to said center section with said second sides thereof toward one another, in said first position said concave center portions at least partially defining an opening sized to receive the first tube and in said second position said second concave portions at least partially defining an opening sized to receive the second tube; and
   d) said insulator can be inserted into an opening in a building member around the first tube with said outer sections in said first position or around the second tube with said outer sections in said second position, such that said outer sections cooperate with said center section to engage the building member and to substantially surround the respective tube and thereby isolate the tube from the building member.

21. The insulator as in claim 20 wherein each of said outer sections include a respective leading edge transverse to said opposite edges of said center section for first insertion into the opening in the building member and a respective trailing edge, each said outer section having first and second stop tabs formed thereon proximate said trailing edge, said first stop tab positioned to extend outwardly from said insulator for engagement with the building member when said outer sections are in said first position and said second stop tab positioned to extend outwardly from said insulator for engagement with the building member when said outer sections are in said second position.

22. The insulator as in claim 20 wherein said center section include a respective leading edge transverse to said opposite edges of said center section for first insertion into the opening in the building member and a respective trailing edge, said center section having first and second stop tabs formed thereon proximate said trailing edge, said first stop tab positioned to extend outwardly from said insulator for engagement with the building member when said outer sections are in said first position and said second stop tab positioned to extend outwardly from said insulator for engagement with the building member when said outer sections are in said second position.

23. An insulator for insertion into an opening in a wooden building member around a tube, said insulator comprising:
   a) a center section having opposed first and second sides, each said side having outwardly extending flexible ribs formed thereon; and
   b) a pair of outer sections hingedly connected to said center section along opposite edges thereof; each of said outer sections having a first side with a first concave portion having a radius selected to be engageable with a first tube of a first diameter and a second side with a second concave portion having a radius selected to be engageable with a second tube of a second diameter larger than said first diameter; wherein:
   c) said outer sections can be folded into either a first position relative to said center section with said first sides thereof toward one another or a second position relative to said center section with said second sides thereof toward one another, in said first position said first concave portions at least partially defining an opening sized to receive the first tube and in said second position said second concave portions at least partially defining an opening sized to receive the second tube;
   d) said insulator can be inserted into an opening in a wooden building member around the first tube with said outer sections in said first position or around the second tube with said outer sections in said second position, such that said outer sections cooperate with said center section to engage the wooden building member and to substantially surround the respective tube and thereby isolate the tube from the wooden building member; and
   e) said ribs on said first side engage the wooden building member inside said opening therein when said insulator is inserted in said opening with said outer sections in said second position and said ribs on said second side engage the wooden building member inside said opening therein when said insulator is inserted in said opening with said outer sections in said first position.

24. The insulator as in claim 22 wherein the building member is a wooden building member and said first sides of said outer sections each include outwardly extending flexible ribs on opposite sides of said concave center portion, said ribs engaging the wooden building member inside said opening therein when said insulator is inserted in said opening with said outer sections in said second position.

25. An insulator for insertion into an opening in a metal building member and around a tube, wherein the opening extends through a relatively thin web of the metal building member, said insulator comprising:
   a) a center section;
   b) a pair of outer sections hingedly connected to said center section along opposite edges thereof; each of said outer sections having a first side with a first concave portion having a radius selected to be engageable with a first tube of a first diameter and a second side with a second concave portion having a radius selected to be engageable with a second tube of a second diameter larger than said first diameter, said center section and each of said outer sections of said insulator each including a respective leading edge for first insertion into the opening in the building member and a respective trailing edge; and
   c) at least one wedge structure extending outwardly from said center section or one of said outer sections proximate the trailing edge thereof, said wedge structure having an inclined and serrated outer surface positioned to engage said web of said metal building member inside of said opening when said insulator is inserted therein; wherein:

d) said outer sections can be folded into either a first position relative to said center section with said first sides thereof toward one another or a second position relative to said center section with said second sides thereof toward one another, in said first position said first concave portions at least partially defining an opening sized to receive the first tube and in said second position said second concave portions at least partially defining an opening sized to receive the second tube; and e) said insulator can be inserted into an opening in a building member around the first tube with said outer sections in said first position or around the second tube with said outer sections in said second position, such that said outer sections cooperate with said center section to engage the building member and to substantially surround the respective tube and thereby isolate the tube from the building member.

26. The insulator as in claim 25 wherein there are a plurality of said wedge structures.

27. The insulator as in claim 26 wherein at least one of said wedge structures is positioned to engage said web of said metal building member when said insulator is inserted into said opening with said outer sections in said first position and at least one other of said wedge structures is positioned to engage said web of said metal building member when said insulator is inserted into said opening with said outer sections in said second position.

28. The insulator as in claim 26 wherein some of said wedge structures are positioned on said center section and others of said wedge structures are positioned on each of said outer sections.

* * * * *